United States Patent [19]

Hans et al.

[11] Patent Number: 4,973,290
[45] Date of Patent: Nov. 27, 1990

[54] AUTOMATIC TENSIONING DEVICE

[75] Inventors: Rüdiger Hans, Niederwerrn; Jürgen Kober, Schwebheim, both of Fed. Rep. of Germany

[73] Assignee: SKF GmbH, Schweinfurt, Fed. Rep. of Germany

[21] Appl. No.: 395,900

[22] Filed: Aug. 18, 1989

[30] Foreign Application Priority Data

Aug. 20, 1988 [IT] Italy ................................ 3828350

[51] Int. Cl.⁵ .............................................. F16H 7/12
[52] U.S. Cl. ..................................... 474/117; 474/135; 474/138
[58] Field of Search ............... 474/101, 109, 110, 111, 474/113-117, 133, 135, 136, 138

[56] References Cited

U.S. PATENT DOCUMENTS 4,752,280  6/1988  Brandenstein et al. ............. 474/138

FOREIGN PATENT DOCUMENTS 336737  10/1930  United Kingdom ................ 474/110

Primary Examiner—Thuy M. Bui
Attorney, Agent, or Firm—Rosen, Dainow & Jacobs

[57] ABSTRACT

An automatic tensioning device for drive belts is equipped with a friction damper with low damping action against vibrations transmitted by the drive belt. A hydraulic shock damper has with high damping action is provided for large surge pulses. Preferably, the hydraulic shock damper an idle stroke in which the friction damper is active.

10 Claims, 2 Drawing Sheets

AUTOMATIC TENSIONING DEVICE

BACKGROUND OF THE INVENTION

1. Field of the Invention

The invention concerns an automatic tensioning device for keeping an idler pulley under predetermined tension that includes elements operating in the pulley's direction of travel.

2. Discussion of Related Art

Tensioning devices of this nature are preferably used in motorcar engines and, as a rule, generate a constant tension in the drive belt under changing operating conditions of the engine. The tension provided by tensioning devices mounted, for example, in a swivable fashion, is generated by means of a spring, which provides automatic compensation when the drive belt is either slack or too taut.

Over the long run, the tension of the drive belt will change between the cold and warm phases of engine operation, due to fatigue of the belt material. During engine operation, it will change due to surge pulses when loads on the generator, vacuum pump, compressor, etc., are turned on and off, and during changes in the load on the engine, or when the vehicle shakes due to poor road conditions. In addition, the idler pulley is affected by the constant vibration of the drive belt caused by the timing gear, combustion-induced effects on the travel of the belt, etc. For these reasons it is recommended that the operating motion of the tensioning device be damped.

However, it is difficult to achieve effective damping because the aforementioned vibrations of the drive belt cause relatively small swivel motion amplitudes in the tensioning device at high frequencies. On the other hand, surge pulses produce overly abrupt, often isolated excursions of the tensioning device.

U.S. Pat. No. 4,283,181, for example, discloses a tensioning device whose swivel bearing is equipped with a friction sleeve having a predetermined radial tension. As a result, a damping friction in both swivel directions of the tensioning device is achieved. A strong radial predetermined tension can provide effective damping of the surge pulses. However, the tensioning device will act like a fixed, immobile guide roller in response to vibration. This means that the vibrations of the drive itself, which may lead to severe wear and tear and premature breakdown, must still somehow be compensated.

German patent No. DE-GM 7 703 393 discloses a hydraulic shock damper which damps the operating motion of the tensioning device hydraulically. In a particular embodiment, a valve is, installed in the fluid channel which, in pulse dampers, achieves excellent damping action in one direction and little damping action in the other. Shock dampers of this type are particularly advantageous for damping large motions with relatively long periods, and are therefore particularly desirable for dissipating the energy in the aforementioned surge pulses. However, they can only be used under certain conditions for damping vibrations. After a short period of operation within a relatively small amplitude range a certain amount of extra clearance space appears in the damper, caused by leakage. Damping is no longer possible in this space. After this has occurred, vibrations of the belt drive are no longer damped in this embodiment. In addition, the usually limited space conditions in tensioning devices allow only short, telescopic shock dampers and, for this reason, the swivel motion must be transferred to the shock damper after reduction. As a result, the aforementioned inoperative extra clearance occupies a considerable part of the motion range of the idler pulley. As a result, the shock damper is at least ineffective in the presence of small swivel motions, and vibrations, in particular.

SUMMARY OF THE INVENTION

It is an objective of the invention to create an automatic tensioning device of the type mentioned above which effectively damps all working motions when in operation, and which adapts to the changing conditions of the belt drive.

This objective is accomplished by the combination of a friction damper providing a light damping action, at least in the normal operating range of the idler pulley, and a hydraulic shock damper providing a stronger damping action at least in a direction of travel of the idler pulley.

Thanks to the combination of two different types of damping, the corresponding elements can be adjusted individually to the characteristic features of the swivel motion to be damped. The hydraulic damper is basically designed to be optimally useful for damping pulse surges. The friction damper smooths lowamplitude vibrations transmitted by the drive belt. The idler pulley of the present invention is readily adapted to any operating situation, including the inactive state of the machine, engine or similar device, through the use of suitable springs, hydraulic or pneumatic devices, etc. In its preferred embodiments, it generates proper damping in the sense of a quiet, noiseless operation and has a long service life, with little wear and tear in the operating condition appropriate to each embodiment.

According to a further characteristic of the invention the friction damper and the hydraulic shock damper will operate in parallel with the hydraulic shock damper, being inoperative within the motion range of the idler pulley covered by vibrations if necessary.

The parallel operation of the damping elements of the hydraulic and friction damping arrangement means that they move simultaneously from an inactive position. This embodiment does not take into account that the hydraulic damper may initially produce an idle stroke, without damping. Alternatively, it is also possible to intentionally arrange the damping so that only the friction damper operates in the range defined by leakage. In either instance, the parallel design ensures that friction damping becomes operational without delay starting from the inactive state and, for motions having amplitudes larger than the vibration amplitudes, acts in addition to a hydraulic damper that provides stronger damping action.

In a preferred embodiment of the invention, the swivel bearing contains integral elements for friction damping, and an externally mounted shock damper. The swivel bearing in question may be executed relatively simply as a friction sleeve made of slide-bearing material having a predetermined radial tension, or as friction disks supported by axial spring action: a hydraulic telescopic shock damper, for example, connected to the swivel arm of the tensioning device. To achieve immediate tensioning of a slack drive belt it is possible to provide and little or no damping against the direction of tensioning, and little or no damping in the direction of tensioning for both with the hydraulic damping and with the friction damping, as described below.

BRIEF DESCRIPTION OF THE INVENTION

Further characteristics of the invention are described hereafter with the aid of the examples shown in the drawing. The drawing shows:

FIG. 1: A top view of a tensioning device with a hydraulic telescopic shock damper and with friction elements incorporated into the swivel bearing, FIG. 2. A partial longitudinal section along the line A—A shown in FIG. 1, and FIG. 3. A longitudinal section of a telescopic shock damper with integral friction elements.

DETAILED DESCRIPTION OF A PREFERRED EMBODIMENT

Figure 1:
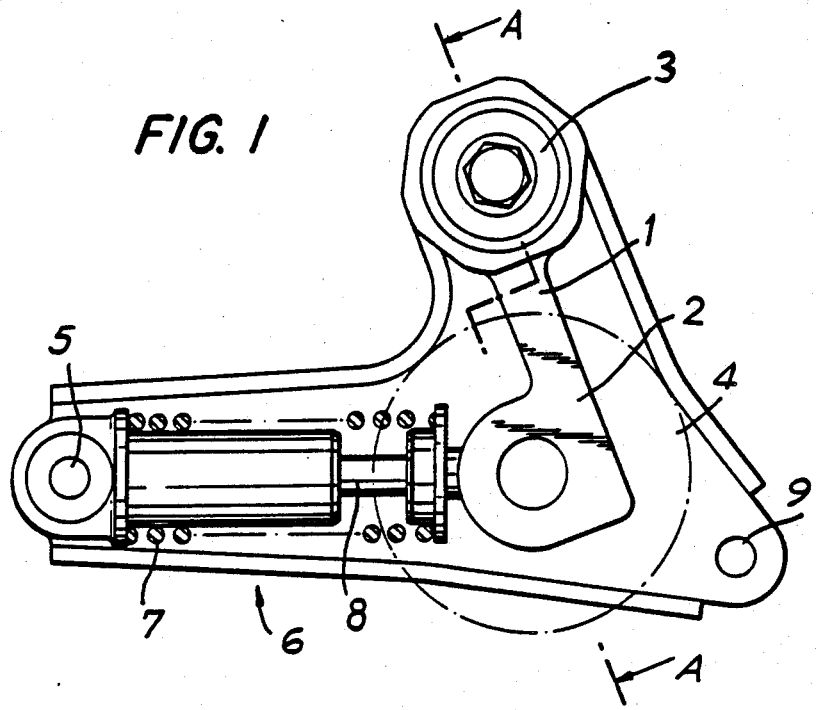
Figure 3:
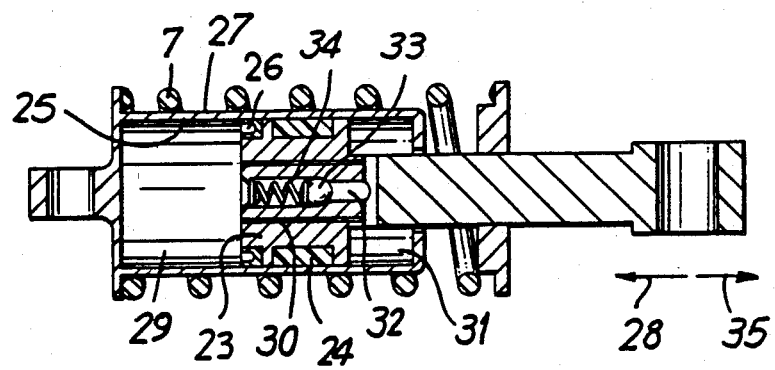

The tensioning device shown in FIG. 1 consists of an arm 1 and an idler pulley 2 rotatably mounted on the arm which, for the sake of clarity, is not shown in full size or detail. At a distance from the idler pulley 2, the arm 1 is equipped with a swivel bearing 3 which is attached to a mounting plate 4.

Between the point of attachment of the idler pulley 2 and a pivot shaft 5 of the mounting plate 4, a hydraulic telescopic shock damper 6 having a coaxial coil spring 7 is provided, located at an angle slightly tangential to the swivel circle of the idler pulley around the swivel bearing 3. The coil spring 7 is designed as a pressure spring and moves the idler pulley 2 and the arm 1 around its swivel bearing 3 in one of the swivel directions. The coil spring 7 and the idler pulley 2 put tension on a drive belt (not shown) which positions the piston rod 8 of the telescopic shock damper 6 between the end points of its range of motion. The telescopic shock damper 6 has a damping effect on the swivel motion of the idler pulley 2. The mounting plate 4 may be attached to an engine block by means of screws such as those inserted through a fastening hole 9 and through the swivel bearing 3.

Figure 2:
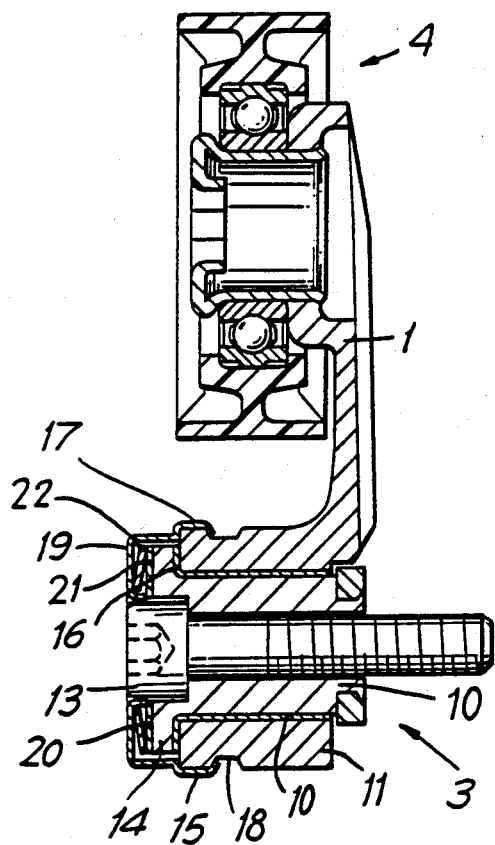

The swivel bearing 3 of the tensioning device contains elements for friction damping, as shown more clearly in FIG. 2. Between the bearing sleeve 10 and the sleeve section 11 of the swivel arm 1, a thin-walled slide bearing bushing 12 has been inserted which extends outward radially near the screw head 13. This is axially adjoined by flange 14 which form one piece with the bearing sleeve 10, and is axially and radially surrounded by a flange sleeve 15 which interlocks axially with the face 16 of the sleeve section 11 and reaches with its radially turned in rim 17 in a groove 18 of the sleeve section 11. Between the portion of the flange 19 which extends to the screw head 13, and the outer friction surface 20 of the flange 14, a damping ring 21 and an axially operating spring washer 22 are installed and secured against rotation.

The resulting friction is such that it effectively damps vibrations of the drive belt which are transmitted as lowamplitude oscillations to the tensioning device. The aforementioned telescopic shock damper 6 produces an idle stroke without damping action when leaving the inactive position that covers the vibration-induced motion range of the tensioning device, because of chambers that are intentionally incompletely filled. With more extensive motions, strong surge pulses affecting the idler pulley, 2, in particular the hydraulic damping of the telescopic shock damper 6 will be added to the friction damping.

As an alternative to the embodiment in FIG. 2 in which friction damper 14, 21, 22 is incorporated in the swivel bearing 3, the friction damper may be incorporated in the hydraulic telescopic shock damper 6. For this reason, the piston 23 has a relatively wide snap ring groove in which a friction ring 24 made of a synthetic material is inserted. Due to the elasticity characteristic of the material, it is held against the cylinder wall 25 of the telescopic shock damper 6 with a predetermined tension, and forms a linearly moving friction damper. The piston 23 is, furthermore, equipped with a progressively acting seal 26 so that hydraulic fluid from the front chamber 29 will flow only through the narrow flow channel 30 into the rear chamber 31 when the idler pulley 4 moves away from the drive belt or when the piston 23 slides into the cylinder 27 in the direction of the arrow 28. This generates relatively strong hydraulic damping of pulse surges, in particular. In this direction of motion 28, the return flow channel 32 is closed by a ball valve 33 with a pressure spring 34. In the opposite direction 35, when the idler pulley 4 moves toward the drive belt, the ball valve 33 will open, causing the hydraulic fluid to flow from the rear chamber 31 into the front chamber 29, without generating any real damping. This hydraulic telescopic shock damper 6, also has an idle stroke that does not provide hydraulic damping due to incomplete filling, and the motion generated by vibrations is damped by the friction damper 24, 25.

We claim

1. An automatic tensioning device for keeping an idler pulley under predetermined tension against a drive belt, said device comprising:
   a friction damper providing a light damping action in the normal operating range of the idler pulley ; and
   a hydraulic shock damper providing stronger damping action in a direction of travel of the idler pulley.

2. The tensioning device of claim 1, wherein the friction damper and the hydraulic shock damper act in parallel.

3. The tensioning device of claim 1 wherein the hydraulic shock damper is inoperative in the range of motion of the idler pulley produced by vibrations.

4. The tensioning device of claim 1, wherein the tensioning device has a swivel bearing including elements for friction damping and an externally mounted hydraulic shock damper.

5. The tensioning device of claim 1, wherein elements for friction damping are incorporated in the hydraulic shock damper.

6. The tensioning device of claim 1, wherein the hydraulic shock damper exerts substantially no damping action in the direction of tensioning of the idler pulley, and a strong damping action in the opposite direction.

7. The tensioning device of claim 1, wherein little or no friction damping is provided in the direction of tensioning and greater friction damping is provided in the opposite direction.

8. The tensioning device of claim 1 wherein said hydraulic shock damper is a pneumatic damper.

9. An automatic tensioning device for keeping an idler pulley under predetermined tension against a drive belt, said device comprising:
   a friction damper providing a light damping action in the normal operating range of the idler pulley; and
   a hydraulic shock damper providing a stronger damping action in a first direction of travel of the idler pulley, the damping action in the opposite direction being also less than the damping action in said first direction.

10. The tensioning device of claim 9 wherein said friction damper provides a damping action beyond the normal operating range of the idler pulley in cooperation with said hydraulic shock damper.

* * * * *

UNITED STATES PATENT AND TRADEMARK OFFICE
CERTIFICATE OF CORRECTION

PATENT NO. : 4,973,290

DATED : November 27, 1990

INVENTOR(S) : Rudiger Hans, Jurgen Kober

It is certified that error appears in the above-identified patent and that said Letters Patent is hereby corrected as shown below:

```
Title page item [30], change "3828350" to
--3828350.6--.

Title page, abstract, line 4, omit "has"
                      line 6, after "shock
damper" insert --has--.

Column 2, line 67, omit "and little or no"
and insert --a high level of damping--.
```

Signed and Sealed this

Second Day of March, 1993

*Attest:*

STEPHEN G. KUNIN

*Attesting Officer*       *Acting Commissioner of Patents and Trademarks*